Patented Jan. 23, 1951

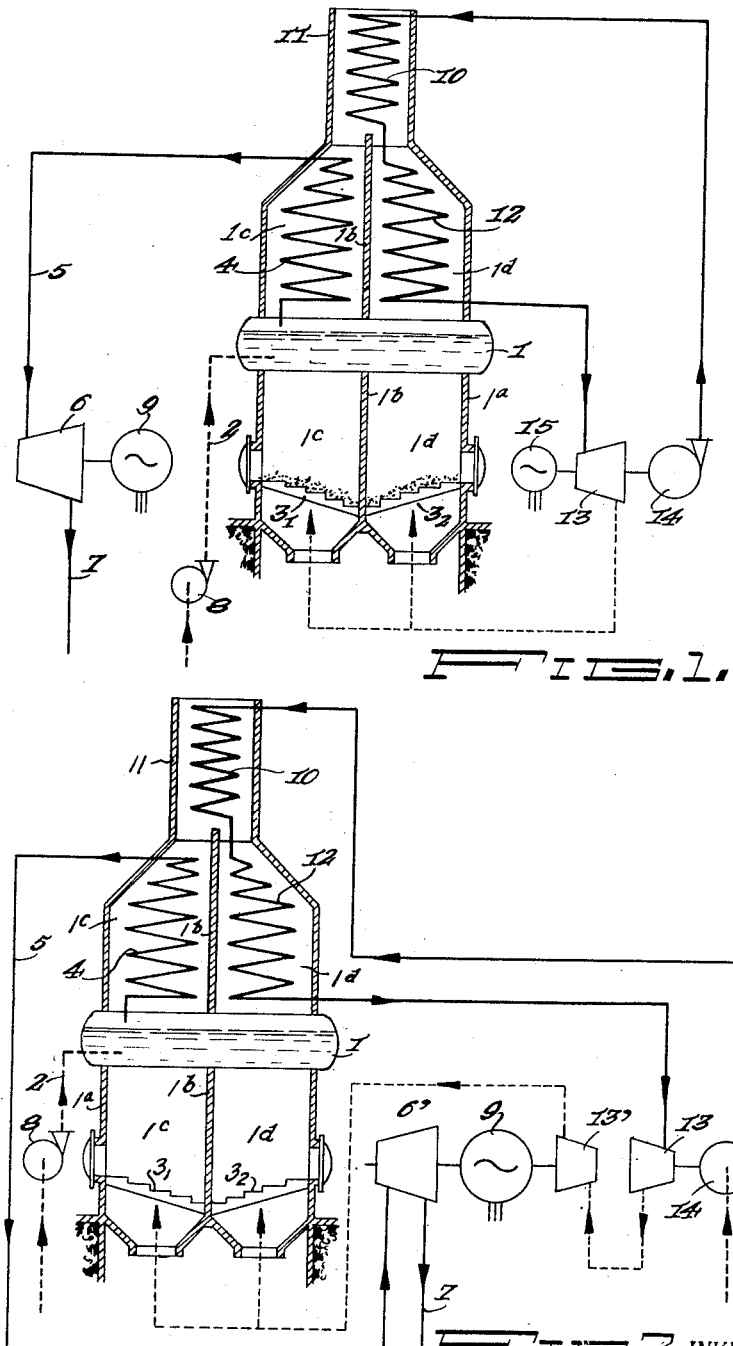

2,539,255

UNITED STATES PATENT OFFICE 2,539,255

STEAM PLANT FOR SERVICING POWER AND DELIVERING INDUSTRIAL STEAM

Josef Karrer and Werner Karrer, Zurich, Switzerland, assignors to Ateliers de Construction Oerlikon, Zurich-Oerlikon, Switzerland, a corporation of Switzerland Application November 15, 1945, Serial No. 628,908
In Switzerland December 23, 1941

Section 1, Public Law 690, August 8, 1946
Patent expires December 23, 1961

3 Claims. (Cl. 60—49)

Steam generators with air heaters in which compressed air is heated by the exhaust gases and fed to an air turbine are commonly known. The air turbine drives the compressor, and the air from the turbine flows as air of combustion to the combustion chamber of the boiler at a more or less high pressure. Coupling the air turbine with a generator of electric current is likewise a commonly known procedure.

The output of the air turbine depends on the temperature to which the compressed air is heated. The degrees of efficiency of the turbine and the compressor also determine the magnitude of the effective output which can be delivered to a generator of electric current. Under present circumstances it is possible to attain, by cutting in a hot air turbine in a steam power plant, an increase of output of approximately 15%, with a somewhat higher degree of efficiency. In doing so an air heater must be built in and a hot air turbine with compressor must be installed. The degrees of efficiency of a steam power plant vary at present between 20 and 30%, the latter value being attained only in the case of great output, high steam pressure and low cooling water temperature.

Industry requires steam for heating and cooking purposes, etc., and for these purposes back pressure turbines and extraction turbines are generally installed at the present time, which are supplied with steam at high pressures. The steam operates with extraordinary success between the initial and the final pressure in the back pressure turbine or between the initial and the extraction pressure in the extraction turbine respectively, since all the heat of the steam withdrawn for industrial purposes is used as effective heat. For this reason the efficiency of such heating power plants is as high as 70% and more.

Steam for industrial purposes (heating and cooking steam, etc.) is needed by large and small plants. In large plants it has become the practice to increase the pressure used in the heating power plants as much as possible so as to obtain high output at maximum efficiency. In small plants the installation of maximum pressure boilers does not pay, and the power requirement needed in excess of the output of the back pressure turbine must be met in some other way, e. g. by purchasing current from an outside network. Frequently it is necessary to install extraction turbines to supply the deficiency of output. However, extraction turbines operate with the steam in the low pressure part with low efficiency, which hardly amounts to more than 20-25%. Extraction turbines require beside the low pressure turbine, the condenser and the pumps above all cooling water, so that the installation of the plant is in addition dependent on the water situation.

Above drawbacks are eliminated by the present invention in that the steam plant is supplemented by an air or gas turbine plant, the gases of combustion of the steam plant, after giving up part of their heat for steam generation, delivering at least part of their residual heat for the heating of air or gas of the air or gas turbine plant. The drop in heat which in a heating power plant is available for the back pressure turbine or the extraction turbine up to the point of extraction, is small as a rule and amounts only to about ⅓ of that of a condensing steam turbine; the internal efficiency is likewise smaller, so that the specific steam consumption is about three times as great as in the case of a condensing steam turbine. In consequence of this circumstance the output of the connected air turbine plant in percentage is now also three times greater than in the case of a steam power plant (condensing turbine). Moreover, as the feed water of a back pressure turbine plant can not be preheated with tapped steam as effectively as in the case of condensing steam turbines, specific fuel consumption increases still further, and for the above reasons the additional output of the air or gas turbine plant may be readily increased to 50% and over of the output of the back pressure turbine, that is to say to a substantial amount for a specific concern.

Another great advantage offered by the invention is the high fuel efficiency with which the additional output is produced in heat power plants. If it is assumed that compressed air at 550° C. is fed to the air turbine $13$ and that the exhaust gases leave the furnace $1a$ at 130° C., we find that the heat supplied to the air turbine has approximately the following efficiency. The mechanical work delivered by the air turbine to the compressor and the current generator is converted into effective heat or effective output with the exception of the bearing and radiation losses, which amounted to about 5%. The compressed air expands in the turbine $13$ to about atmospheric pressure, leaves at about 350° C. and is fed to the grates $3_1$, $3_2$. The exhaust gases leave at 130° C., the hot air thus giving off 220° of the 350° C. to the furnace $1a$, and about 98% of its heat (2% radiation losses) is used effectively. We thus have a degree of efficiency of the heat utilization of the air turbine of approximately 70%, which is just as high as the efficiency of the back pressure turbine plant.

The invention yields another advantage. Back pressure steam turbines require no cooling water, since there is no steam that is to be condensed. As a rule the output of the back pressure turbine is not sufficient for the power requirement of the plant and current must be obtained from an outside source, or the deficiency in output must be produced by means of a condensing turbine operating at low efficiency. The invention makes the works independent both of outside current and cooling water. The heat power plant may be erected where operating conditions are most favorable.

The accompanying drawing shows two forms of embodiment of the subject matter of the invention.

In the drawing,

Fig. 1 is a diagrammatic elevational view of a steam power plant constituting the invention, and Fig. 2 is a similar view showing a modification of the invention.

In Fig. 1, $1$ is the heat generator or boiler built into furnace $1a$, $2$ the feeder; $3_1$ and $3_2$ show the grates on which the coal is burned. The steam produced in the boiler $1$ is superheated in a superheater $4$, and flows through a pipe $5$ to the back pressure turbine $6$. The exhaust steam is fed to the point of consumption through the pipe $7$. A pump $8$ forces the feed water to the boiler $1$. The furnace $1a$ proper is subdivided by a partition $1b$ into adjacent chambers $1c$, $1d$, in the former of which is located the steam superheater $4$, and in the chamber $1d$ is located an air heater $12$, forming part of an air turbine plant which is thus built into the furnace $1a$ in conjunction with the above described back pressure steam turbine plant. Compressed air is heated in an air preheater $10$ and an air heater $12$. It flows to the turbine $13$, which drives a compressor $14$ and a current generator $15$. The fresh air is drawn in by suction by the compressor $14$ and brought under pressure (e. g. 4 atm. abs.) Hereupon the compressed air flows to the air preheater $10$, air heater $12$ and to the air turbine $13$. After the expansion of the compressed air in the turbine the released air flows as air of combustion to the grates $3_1$ and $3_2$. Two furnaces are provided. In both parts $1c$, $1d$ the gases of combustion deliver their high temperature heat to the boiler $1$, afterwards a portion flows through the steam superheater $4$ and the rest through the air heater $12$, whereupon the two gas portions flow off together through the air preheater $10$ which is built into the space $11$.

To insure an effective working of the air turbine plant also at partial load, the air turbine $13$ may be separated into two parts, viz., an effective output turbine and a compressor turbine. In the latter the number of revolutions drops with decreasing load.

The effective output machines of the two plants may also be coupled to each other or combined to form a single machine. Fig. 2 shows such an example. The back pressure turbine $6'$ operates the current generator $9$. The air turbine consists of the compressor turbine $13$, which drives the compressor $14$, and the effective output turbine $13'$, which also operates the effective output machine $9$. For the rest this arrangement corresponds to Fig. 1.

Since the output and the amount of required steam are often very variable in back pressure turbines, the fire chamber $1c$ may be stoked lightly or cut off entirely, which makes it possible to change the amount of the steam and the output.

Having thus described our invention we claim:

1. A heat plant for servicing industrial steam and power having the combination of a furnace subdivided by an upright wall into two heat chambers, each of said chambers having a fire grate, a steam generator in said furnace being heated by both of said chambers, a steam superheater in one of said chambers, a back pressure steam turbine operated by said superheater, the exhaust from said turbine servicing industrial steam, an air heater in the other of said chambers, a hot air turbine operated by said air heater, and means to direct the exhaust from said hot air turbine to said fire grates.

2. A heat plant for servicing industrial steam and power having the combination of a furnace subdivided by an upright wall into two heat chambers, each of said chambers having a fire grate, a steam generator in said furnace being heated by both of said chambers, a steam superheater in one of said chambers, a back pressure steam turbine operated by said superheater, the exhaust from said turbine servicing industrial steam, an air heater in the other of said chambers, a hot air turbine operated by said air heater, means to direct the exhaust from said hot air turbine to said fire grates, and an air compressor for said air heater and a generator being driven by said hot air turbine.

3. A heat plant for servicing industrial steam and power having the combination of a furnace subdivided by an upright wall into two heat chambers, each of said chambers having a fire grate, a steam generator in said furnace being heated by both of said chambers, a steam superheater in one of said chambers, a back pressure steam turbine operated by said superheater, the exhaust from said turbine servicing industrial steam, an air heater in the other of said chambers, a hot air turbine operated by said air heater, an air compressor for said air heater being driven by said air turbine, a secondary hot air turbine being operated by the exhaust from said hot air turbine, a generator driven by said steam turbine and said secondary hot air turbine, and means to direct the exhaust from said secondary air turbine to said fire grates.

JOSEF KARRER.
WERNER KARRER.

REFERENCES CITED

The following references are of record in the file of this patent:

UNITED STATES PATENTS

| Number | Name | Date |
|---|---|---|
| 1,621,435 | Rosch | Mar. 15, 1927 |
| 1,874,620 | Radford | Aug. 30, 1932 |
| 1,931,948 | Armacost | Oct. 24, 1933 |
| 1,978,837 | Forsling | Oct. 30, 1934 |
| 2,203,731 | Keller | June 11, 1940 |
| 2,374,510 | Traupel | Apr. 24, 1945 |

FOREIGN PATENTS

| Number | Country | Date |
|---|---|---|
| 627,514 | Germany | Mar. 17, 1936 |